(12) United States Patent
Wang

(10) Patent No.: US 12,381,674 B2
(45) Date of Patent: Aug. 5, 2025

(54) REFERENCE SIGNAL TRANSMISSION AND RECEPTION IN CONTINUOUS TIME UNITS

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 207 days.

(21) Appl. No.: 17/861,169

(22) Filed: Jul. 9, 2022

(65) Prior Publication Data
US 2022/0345273 A1   Oct. 27, 2022

Related U.S. Application Data

(63) Continuation of application No. PCT/CN2021/077676, filed on Feb. 24, 2021.

(30) Foreign Application Priority Data

Jan. 10, 2020 (CN) .......................... 202010026660.2

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ..... H04L 5/0048; H04L 5/005; H04L 5/0051; H04W 72/0446
See application file for complete search history.

(56) References Cited

U.S. PATENT DOCUMENTS

| | | | |
|---|---|---|---|
| 2014/0036809 | A1 | 2/2014 | Xu et al. |
| 2014/0112168 | A1 | 4/2014 | Chen et al. |
| 2017/0325216 | A1 | 11/2017 | Nogami et al. |
| 2019/0215110 | A1* | 7/2019 | Yang ..................... H04W 76/27 |
| 2019/0320453 | A1 | 10/2019 | Hosseini et al. |

(Continued)

FOREIGN PATENT DOCUMENTS

| | | |
|---|---|---|
| CN | 104956619 A | 9/2015 |
| CN | 107294686 A | 10/2017 |

(Continued)

OTHER PUBLICATIONS

WIPO, International Search Report and Written Opinion for International Application No. PCT/CN2021/077676, Mar. 26, 2021.

(Continued)

*Primary Examiner* — Brian T Le
(74) *Attorney, Agent, or Firm* — HAUPTMAN HAM, LLP

(57) ABSTRACT

A method for reference signal transmission, a method for reference signal reception, and an apparatus for communication are provided. The method includes: transmitting, by a first communication node, one or more reference signals to a second communication node in N bundled and continuous time units, where N is an integer greater than 1.

14 Claims, 4 Drawing Sheets

(56) References Cited

U.S. PATENT DOCUMENTS

2020/0350970 A1* 11/2020 Liu ................. H04B 7/0628
2021/0037525 A1*  2/2021 Xu .................. H04W 72/02

FOREIGN PATENT DOCUMENTS

| | | |
|---|---|---|
| CN | 110034898 A | 7/2019 |
| WO | 2018082672 A1 | 5/2018 |

OTHER PUBLICATIONS

38533_CR0306_(Rel-16)_R5-196601_38.533-Correction test frequency reference and test mode ch4, dated Aug. 16, 2019.

The first office action issued in corresponding CN application No. 202010026660.2 dated Jan. 6, 2022.

The first office action issued in corresponding JP application No. 2022-542785 dated Sep. 20, 2023.

The extended European search report issued in corresponding EP application No. 21739005.3 dated Feb. 15, 2024.

The second office action issued in corresponding CN application No. 202010026660.2 dated Jul. 18, 2022.

R5-196602, 38533_CR0307_(Rel-16) Correction of the reference for test frequencies and test mode—Chapter 6, 3GPP TSG-RAN5 Meeting #84, Ljubljana, Slovenia, Sep. 11, 2019.

The third office action issued in corresponding CN application No. 202010026660.2 dated Jan. 18, 2023.

Samsung, Summary of email Discussion for Rel. 17 enhancements on MIMO for NR, 3GPP TSG RAN#86 RP-192435, 3GPP, Dec. 3, 2019.

NTT Docomo, Inc, Discussion on SRS enhancement, 3GPP TSG RAN WG1#103-e R1-2009179, 3GPP, Nov. 1, 2020.

MediaTek Inc., Enhancements on SRS flexibility, coverage and capacity, 3GPP TSG RAN WG1#103-e R1-2008959, 3GPP, Nov. 1, 2020.

Vivo, Discussion on physical-layer procedures for UE/gNB measurements, 3GPP TSG RAN WG1#98b R1-1910240, 3GPP, Oct. 4, 2019.

Spreadtrum Communications, Considerations on SRS enhancement, 3GPP TSG RAN WG1#102-e R1-2006255, 3GPP, Aug. 8, 2020.

CATT, On enhancements on SRS flexibility, coverage and capacity, 3GPP TSG RAN WG1#103-e R1-2007829, 3GPP, Nov. 1, 2020.

* cited by examiner

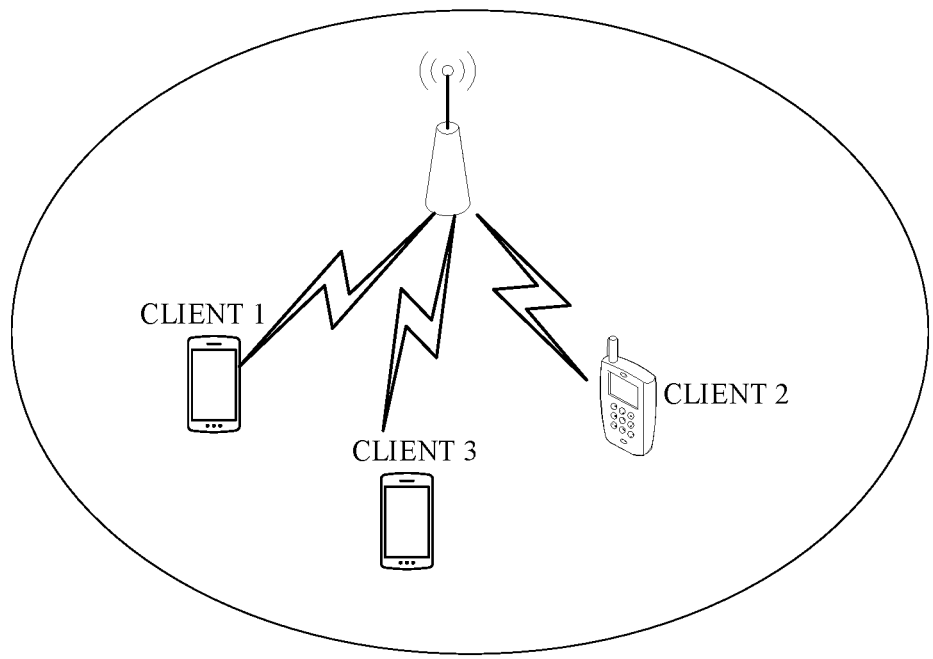
FIG. 1
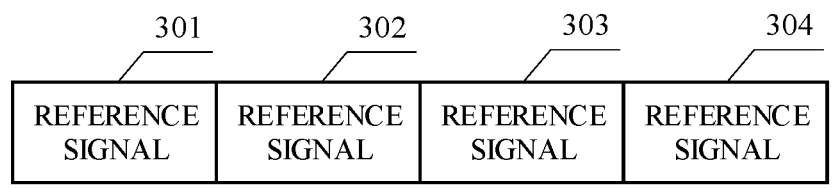
FIG. 2
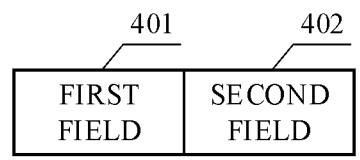
FIG. 3
FIG. 4

REFERENCE SIGNAL TRANSMISSION AND RECEPTION IN CONTINUOUS TIME UNITS

CROSS-REFERENCE TO RELATED APPLICATION(S)

This application is a continuation of International Application No. PCT/CN2021/077676, filed Feb. 24, 2021, which claims priority to Chinese Patent Application No. 202010026660.2, filed Jan. 10, 2020, the disclosures of which are hereby incorporated by reference in their entireties.

TECHNICAL FIELD

The application relates to the technical field of communication, and more particular, to a method for reference signal transmission, a method for reference signal reception, and an apparatus for communication.

BACKGROUND

The fifth generation (5G) communication system emerges, to cope with explosion of mobile data traffic in the future, massive mobile communication device connections, and various emerging new services and application scenarios. The 5G communication system can support different services, such as enhanced mobile broadband (eMBB) services, massive machine type communication (MTC) services, ultra-reliable and low latency communication (URLLC) services, multimedia broadcast multicast service (MBMS) services, and positioning services, etc.

The URLLC service is an important service in the 5G communication system, and requires high reliability and short delay during transmission. Therefore, to ensure the reliability of the URLLC service, URLLC service data can be transmitted between a network device and a terminal device in the 5G communication system by means of multiple repetitions. That is, the same URLLC service data can be repeatedly transmitted N times between the network device and the terminal device on N transmission opportunities.

An existing protocol supports repetition of a sounding reference signal (SRS). However, for an aperiodic SRS, only intra-slot repetition is supported, and inter-slot repetition is not supported, so there is a potential problem of SRS coverage. Therefore, a new method for SRS transmission needs to be studied.

SUMMARY

In a first aspect, embodiments of the application provide a method for reference signal transmission. The method includes: transmitting, by a first communication node, one or more reference signals to a second communication node in N bundled and continuous time units, where N is an integer greater than 1.

In a second aspect, embodiments of the application provide a method for reference signal reception. The method may include: receiving, by a second communication node, one or more reference signals transmitted by a first communication node in N bundled and continuous time units, where N is an integer greater than 1.

In a third aspect, embodiments of the application provide an apparatus for communication. The apparatus includes a processor, a transceiver, and a memory configured to store computer programs. The processor is configured to invoke and execute the computer programs stored in the memory to cause the transceiver to: transmit one or more reference signals to a second communication node in N bundled and continuous time units, where N is an integer greater than 1.

BRIEF DESCRIPTION OF THE DRAWINGS

To describe technical solutions in embodiments of the application or in the background more clearly, the following briefly introduces the accompanying drawings required for describing embodiments of the application or the background.

FIG. 1 is a schematic diagram of a network architecture disclosed in embodiments of the application.

FIG. 2 is a flowchart of a method for reference signal transmission provided in embodiments of the application.

FIG. 3 is a schematic diagram of N bundled and continuous time units for transmission of one or more reference signals provided in embodiments of the application.

FIG. 4 is a schematic structural diagram of a capability instruction provided in embodiments of the application.

DETAILED DESCRIPTION

Figure 5:
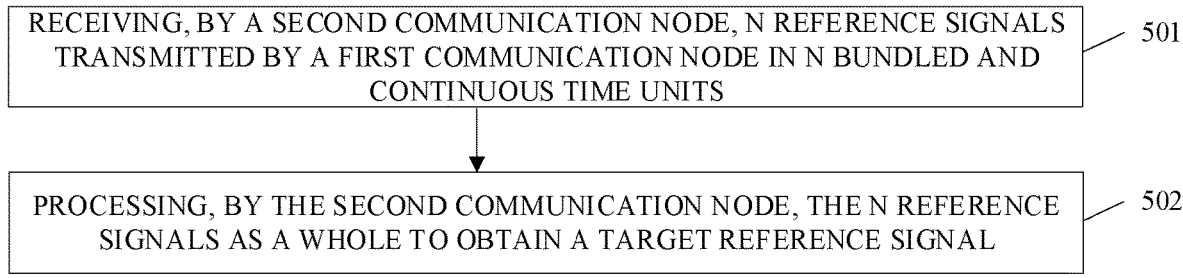
FIG. 5 is a flowchart of a method for reference signal reception provided in embodiments of the application.

The terms "first", "second", "third" and the like used in embodiments in the specification, the claims, and the accompany drawings of the application are used to distinguish similar objects rather than describe a particular order. In addition, the terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not expressly listed or inherent to the process, method, product, or device. "And/or" means to select one or both of two objects it is connected to. For example, "A and/or B" refers to A, B, or A+B.

Embodiments of the application disclose a method for reference signal transmission, a method for reference signal reception, and an apparatus for communication, to transmit multiple identical reference signals in multiple bundled (also referred to as bound) and continuous time units. For better understanding of the method for reference signal transmission, the method for reference signal reception, and the apparatus for communication disclosed in embodiments of the application, the following describes a network architecture applicable to embodiments of the application. The methods disclosed in embodiments of the application are applicable to a fifth generation (5G) new radio access technology (RAT) (NR) system, and are also applicable to other communication systems, as long as there is an entity in the communication system that needs to transmit to another entity a reference signal, such as a sounding reference signal (SRS). The following first introduces a network architecture to which the methods disclosed in embodiments of the application are applicable.

Embodiments of the application disclose a method for reference signal transmission, a method for reference signal reception, and an apparatus for communication, which can reduce the transmission delay and improve the communication efficiency.

Embodiments of the application provide a method for reference signal transmission. The method includes: transmitting, by a first communication node, one or more reference signals to a second communication node in N bundled and continuous time units, where N is an integer greater than 1.

Optionally, the first communication node is a terminal device, such as a mobile phone, the second communication node is a network device, such as a base station, and the reference signal is an uplink (UL) reference signal, such as a sounding reference signal (SRS). Optionally, the first communication node is a network device, such as a base station, the second communication node is a terminal device, such as a mobile phone, and the reference signal is a downlink (DL) reference signal, such as a cell reference signal (CRS). Optionally, the second communication node can process the one or more reference signals as a whole to obtain a target reference signal. Exemplarily, the second communication node performs soft combining on the one or more reference signals to obtain the target reference signal. The time unit may be a time slot, a subframe, a mini-slot, a radio frame transmission time interval (TTI), etc. Optionally, each of the one or more reference signals corresponds to a same number of bundled and continuous time units. Exemplarily, each time unit corresponds to one reference signal. Exemplarily, each time unit corresponds to multiple reference signals, such as 2, 3, 4 reference signals, etc., which is not limited herein. It can be understood that the first communication node may transmit one or more reference signals to the second communication node in multiple continuous time units, where the multiple continuous time units are bundled together. It should be understood that the first communication node can maintain the phase continuity of N continuous time units, and therefore can transmit one or more reference signals to the second communication node in the N bundled and continuous time units. Exemplarily, the continuous time units refer to continuous UL time units. Optionally, time bundling of the N bundled and continuous time units refers to repeatedly transmitting a same channel or signal in N continuous time units. Optionally, time bundling of the N bundled and continuous time units is similar to TTI bundling. In a currently adopted scheme for reference signal transmission, one or more reference signals are transmitted in one time unit. When the transmission power of the first communication node is low or the channel quality is poor, the second communication node may not be able to accurately obtain the reference signal transmitted by the first communication node, which may affect the system performance.

In embodiments of the application, the first communication node transmits the one or more reference signals to the second communication node in the N bundled and continuous time units, so that the second communication node can process the multiple reference signals as a whole to obtain an accurate reference signal, and the signal energy can be increased through accumulation over time, thereby improving the system performance.

In some optional implementations, the method further includes: transmitting, by the first communication node, capability signaling to the second communication node, where the capability signaling indicates whether the first communication node has a time bundling capability, and the time bundling capability is a capability to repeatedly transmit a reference signal in at least two bundled and continuous time units.

In these implementations, the first communication node can transmit the capability instruction to the second communication node to indicate whether the first communication node has the time bundling capability, so as to facilitate subsequent transmission of the one or more reference signals to the second communication node in the N bundled and continuous time units.

In some optional implementations, the capability signaling includes a first field and a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission.

In these implementations, the first communication node can transmit the capability instruction to the second communication node to accurately indicate the target time-bundling-size, where the capability instruction occupies less bits.

In some optional implementations, transmitting, by the first communication node, the one or more reference signals to the second communication node in the N bundled and continuous time units includes: transmitting, by the first communication node, the one or more reference signals to the second communication node in the N bundled and continuous time units according to configuration information, where the configuration information is used to configure a target time-bundling-size, and the target time-bundling-size refers to a number of bundled and continuous time units occupiable by the first communication node for reference signal transmission.

In some optional implementations, prior to transmitting, by the first communication node, the one or more reference signals to the second communication node in the N bundled and continuous time units, the method further includes: receiving, by the first communication node, control information transmitted by the second communication node, where the control information indicates a target time-bundling-size, and the target time-bundling-size refers to a number of bundled and continuous time units occupiable by the first communication node for reference signal transmission, and transmitting, by the first communication node, the one or more reference signals to the second communication node in the N bundled and continuous time units includes: transmitting, by the first communication node, the one or more reference signals to the second communication node in the N bundled and continuous time units according to the control information.

In some optional implementations, the first communication node is a terminal device, the second communication node is a network device, and the method further includes: receiving, by the first communication node, high-layer signaling, where the high-layer signaling is used to configure multiple candidate time-bundling-sizes, and the multiple candidate time-bundling-sizes include the target time-bundling-size, and transmitting, by the first communication node, the one or more reference signals to the second communication node in the N bundled and continuous time units according to the control information includes: determining, by the first communication node, the target time-bundling-size from the multiple candidate time-bundling-sizes according to the control information, and transmitting, by the first communication node, the one or more reference signals to the second communication node in the N bundled and continuous time units.

Embodiments of the application provide a method for reference signal reception. The method may include: receiving, by a second communication node, one or more reference signals transmitted by a first communication node in N bundled and continuous time units, where N is an integer greater than 1.

Optionally, the second communication node processes the one or more reference signals as a whole to obtain a target reference signal. Optionally, the second communication node performs soft combining on the one or more reference signals to obtain the target reference signal. The time unit may be a time slot, a subframe, a mini-slot, a radio frame TTI, etc. Optionally, each of the one or more reference signals corresponds to a same number of bundled and continuous time units. Exemplarily, each time unit corresponds to one reference signal. Exemplarily, each time unit corresponds to multiple reference signals, such as 2, 3, 4 reference signals, etc., which is not limited herein. In embodiments of the application, the second communication node processes the one or more reference signals as a whole to obtain an accurate reference signal, thereby improving the system performance.

In some optional implementations, the method further includes: receiving, by the second communication node, capability signaling transmitted by the first communication node, where the capability signaling indicates whether the first communication node has a time bundling capability, and the time bundling capability is a capability to repeatedly transmit a reference signal in at least two bundled and continuous time units.

In some optional implementations, the capability signaling includes a first field and a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission.

In some optional implementations, prior to receiving, by the second communication node, the one or more reference signals transmitted by the first communication node in the N bundled and continuous time units, the method further includes: transmitting, by the second communication node, control information to the first communication node, where the control information indicates a target time-bundling-size, and the target time-bundling-size refers to a number of bundled and continuous time units occupiable by the first communication node for reference signal transmission.

In some optional implementations, the first communication node is a terminal device, the second communication node is a network device, and the method further includes: transmitting, by the second communication node, high-layer signaling to the first communication node, where the high-layer signaling is used to configure one or more candidate time-bundling-sizes for the first communication node, each candidate time-bundling-size refers to a number of bundled and continuous time units occupiable by the first communication node for reference signal transmission, and the multiple candidate time-bundling-sizes include the target time-bundling-size.

Embodiments of the application provide a method for communication, the method includes: transmitting, by a first communication node, capability signaling to a second communication node, where the capability signaling indicates whether the first communication node has a time bundling capability, and the time bundling capability is a capability to repeatedly transmit one or more reference signals in at least two bundled and continuous time units.

In embodiments of the application, the capability instruction can be transmitted to the second communication node to indicate whether the first communication node has the time bundling capability, so as to determine whether to repeatedly transmit the one or more reference signals to the second communication node in the at least two bundled and continuous time units.

In optional implementations, the capability signaling includes a first field and/or a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission.

Embodiments of the application provide a method for communication, the method includes: receiving, by a second communication node, capability signaling from a first communication node, where the capability signaling indicates whether the first communication node has a time bundling capability, and the time bundling capability is a capability to repeatedly transmit one or more reference signals in at least two bundled and continuous time units.

In optional implementations, the capability signaling includes a first field and/or a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission.

Embodiments of the application provide an apparatus for communication. The apparatus includes a transmitting unit configured to transmit one or more reference signals to a second communication node in N bundled and continuous time units, where N is an integer greater than 1.

In some optional implementations, the transmitting unit is further configured to transmit capability signaling to the second communication node, where the capability signaling indicates whether the first communication node has a time bundling capability, and the time bundling capability is a capability to repeatedly transmit a reference signal in at least two bundled and continuous time units.

In some optional implementations, the capability signaling includes a first field and a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission.

In some optional implementations, the transmitting unit is specifically configured to transmit the one or more reference signals to the second communication node in the N bundled and continuous time units according to configuration information, where the configuration information is used to configure a target time-bundling-size, and the target time-bundling-size refers to a number of bundled and continuous time units occupiable by the first communication node for reference signal transmission.

In some optional implementations, the apparatus for communication further includes a receiving unit configured to receive control information transmitted by the second communication node, where the control information indicates a target time-bundling-size, and the target time-bundling-size refers to a number of bundled and continuous time units occupiable by the first communication node for reference signal transmission, and the transmitting unit is specifically configured to transmit the one or more reference signals to the second communication node in the N bundled and continuous time units according to the control information.

In some optional implementations, the receiving unit is further configured to receive high-layer signaling, where the high-layer signaling is used to configure multiple candidate time-bundling-sizes, and the multiple candidate time-bundling-sizes include the target time-bundling-size, and the transmitting unit is specifically configured to determine the target time-bundling-size from the multiple candidate time-bundling-sizes according to the control information, and transmit the one or more reference signals to the second communication node in the N bundled and continuous time units.

Embodiments of the application provide another apparatus for communication. The apparatus includes a receiving unit configured to receive one or more reference signals transmitted by a first communication node in N bundled and continuous time units, where N is an integer greater than 1.

In some optional implementations, the apparatus further includes a processing unit configured to process the one or more reference signals as a whole to obtain a target reference signal.

In some optional implementations, the receiving unit is further configured to receive capability signaling transmitted by the first communication node, where the capability signaling indicates whether the first communication node has a time bundling capability, and the time bundling capability is a capability to repeatedly transmit a reference signal in at least two bundled and continuous time units.

In some optional implementations, the capability signaling includes a first field and a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission.

In some optional implementations, the apparatus for communication further includes a transmitting unit configured to transmit control information to the first communication node, where the control information indicates a target time-bundling-size, and the target time-bundling-size refers to a number of bundled and continuous time units occupiable by the first communication node for reference signal transmission.

In some optional implementations, the transmitting unit is further configured to transmit high-layer signaling to the first communication node, where the high-layer signaling is used to configure one or more candidate time-bundling-sizes for the first communication node, each candidate time-bundling-size refers to a number of bundled and continuous time units occupiable by the first communication node for reference signal transmission, and the multiple candidate time-bundling-sizes include the target time-bundling-size.

Embodiments of the application provide another apparatus for communication. The apparatus includes a transmitting unit configured to transmit capability signaling to a second communication node, where the capability signaling indicates whether a first communication node has a time bundling capability, and the time bundling capability is a capability to repeatedly transmit one or more reference signals in at least two bundled and continuous time units.

Embodiments of the application provide another apparatus for communication. The apparatus includes a receiving unit configured to receive capability signaling from a first communication node, where the capability signaling indicates whether the first communication node has a time bundling capability, and the time bundling capability is a capability to repeatedly transmit one or more reference signals in at least two bundled and continuous time units.

Embodiments of the application provide an apparatus for communication. The apparatus for communication includes a processor and an interface circuit. The interface circuit is configured to receive code instructions and transmit the code instructions to the processor. The processor is configured to execute the code instructions to perform the method described above.

Embodiments of the application provide a communication system. The communication system includes a network device and a terminal device. The terminal device is configured to perform the method described above, and the network device is configured to perform the method described above.

Embodiments of the application provide a communication system. The communication system includes a network device and a terminal device. The terminal device is configured to perform the method described above, and the network device is configured to perform the method described above.

Embodiments of the application provide a readable storage medium for storing instructions, which when executed, cause the method described above to be performed.

Embodiments of the application provide a computer program product including instructions, which when executed, cause the method described above to be performed.

Referring to FIG. 1, FIG. 1 is a schematic diagram of a network architecture disclosed in embodiments of the application. As illustrated in FIG. 1, the network architecture is applicable to a scenario where a reference signal is transmitted in multiple time units, that is, a scenario where a reference signal is transmitted in multiple bundled and continuous time units. A network device is a network-side entity configured to transmit or receive a signal, such as a gNB. A terminal device is a user-side entity configured to receive or transmit a signal, such as a mobile phone. Since a base station and user equipment (UE) are widely used in various scenarios, in the following, the base station is used as an example of the network device, and the UE is used as an example of the terminal device. As illustrated in FIG. 1, the network architecture includes a base station, UE1, UE2, and UE3. In the communication system, the base station can transmit a downlink (DL) reference signal to UE1-UE3, UE1-UE3 can perform DL channel estimation, DL channel quality measurement, cell search, etc., according to the DL reference signal. In the communication system, UE1-UE3 can transmit to the base station an uplink (UL) reference signal, such as an SRS. The base station can perform UL channel estimation, UL channel quality measurement, etc., according to the UL reference signal.

The following describes in detail a method for reference signal transmission and a method for reference signal reception provided in embodiments of the application.

FIG. 2 is a flowchart of a method for reference signal transmission provided in embodiments of the application. As illustrated in FIG. 2, the method may include the following.

201. A first communication node transmits one or more reference signals to a second communication node in N bundled and continuous time units.

Optionally, each of the one or more reference signals corresponds to a same number of bundled and continuous time units, and N is an integer greater than 1. Optionally, the first communication node is a terminal device, such as a mobile phone, the second communication node is a network device, such as a base station, and the reference signal is a UL reference signal, such as an SRS. Optionally, the first communication node is a network device, such as a base station, the second communication node is a terminal device, such as a mobile phone, and the reference signal is a DL reference signal, such as a cell reference signal (CRS).

Optionally, the second communication node can process the one or more reference signals as a whole to obtain a target reference signal. Exemplarily, the second communication node performs soft combining on the one or more reference signals to obtain the target reference signal. Exemplarily, the second communication node may also perform soft combining on channel estimation results of the one or more reference signals to obtain a target channel estimation result. The time unit may be a time slot, a subframe, a mini-slot, a radio frame transmission time interval (TTI), etc., which is not limited herein. Optionally, each of the one or more reference signals corresponds to a same number of bundled and continuous time units. Exemplarily, each time unit corresponds to one reference signal. Exemplarily, each time unit corresponds to multiple reference signals, such as 2, 3, 4 reference signals, etc., which is not limited herein. It can be understood that the first communication node may transmit one or more reference signals to the second communication node in multiple continuous time units, where the multiple continuous time units are bundled together. It should be understood that the first communication node can maintain the phase continuity of N continuous time units, and therefore can transmit one or more reference signals to the second communication node in the N bundled and continuous time units. Exemplarily, the continuous time units refer to continuous UL time units. Optionally, time bundling of the N bundled and continuous time units refers to repeatedly transmitting a same channel or signal in N continuous time units. Optionally, the time bundling of the N bundled and continuous time units is similar to TTI bundling, that is, an SRS is repeatedly transmitted in multiple continuous time units. FIG. 3 is a schematic diagram of N bundled and continuous time units for transmission of one or more reference signals provided in embodiments of the application. As illustrated in FIGS. 3, 301, 302, 303, and 304 respectively correspond to a time unit, and each time unit is used to transmit a reference signal. FIG. 3 only illustrates an example, in the application, N is only limited to be an integer greater than 1 and may be 2, 3, 4, etc.

In some embodiments, after receiving an SRS trigger instruction transmitted from the second communication node, the first communication node performs step 201, that is, the first communication node transmits an SRS aperiodically.

In some embodiments, the first communication node may transmit the SRS periodically. That is, the first communication node may perform step 201 periodically.

In embodiments of the application, the first communication node transmits the one or more reference signals to the second communication node in the N bundled and continuous time units, so that the second communication node can process the one or more reference signals as a whole to obtain an accurate reference signal, and then more accurately perform channel estimation, channel quality detection, etc., thereby reducing the transmission delay and improving the system performance.

FIG. 2 illustrates a manner for the first communication node to transmit the one or more reference signals to the second communication node in the N bundled and continuous time units. It should be understood that the first communication node needs to have a time bundling capability, that is, a capability to transmit a reference signal in multiple bundled and continuous time units. The following describes how the second communication node determines whether the first communication node has the time bundling capability.

In some embodiments, the first communication node may transmit a capability instruction to the second communication node to indicate whether the first communication node has the time bundling capability. Optionally, after receiving a capability query instruction from the second communication node, the first communication node transmits the capability instruction to the second communication node. The capability query instruction is used to query whether the first communication node has the time bundling capability.

Optionally, the time bundling capability is an SRS time bundling capability. The time bundling capability is a capability to repeatedly transmit a reference signal in at least two bundled and continuous time units. It can be understood that after the first communication node transmits the capability instruction to the second communication node, if the second communication node enables time bundling of reference signals, the first communication node can transmit a reference signal to the second communication node by using the time bundling capability, that is, transmit one or more reference signals to the second communication node in multiple bundled and continuous time units.

Optionally, the capability signaling includes a first field and a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission. Optionally, the target time-bundling-size is a target SRS time-bundling-size, which refers to the number of continuously transmitted SRSs. Exemplarily, the first field includes a bit. If the bit is 0, it indicates that the first communication node does not have the time bundling capability, and if the bit is 1, it indicates that the first communication node has the time bundling capability. Exemplarily, the second field includes K bits, the K bits are used to indicate the target time-bundling-size, and K is an integer greater than 1. For example, K is 2, the second field is 10, and the second field indicates that the maximum time-bundling-size is 2. For another example, K is 2, the second field is 11, and the second field indicates that the maximum time-bundling-size is 3. FIG. 4 is a schematic structural diagram of a capability instruction provided in embodiments of the application. As illustrated in FIG. 4, the capability instruction includes a first field 401 and a second field 402. For example, the first field 401 is 1, and the first field 401 indicates that the first communication node has the time bundling capability. For another example, the first field 401 is 1, the second field is 10, the first field 401 indicates that the first communication node has the time bundling capability, and the second field 402 indicates that the maximum time-bundling-size is 2.

The foregoing embodiments has not described an implementation of step 201 in detail, and the following introduces some implementations of step 201.

Manner 1

The first communication node transmits the one or more reference signals to the second communication node in the N bundled and continuous time units according to configuration information. The configuration information is used to configure a target time-bundling-size, and the target time-bundling-size refers to a number of bundled and continuous time units occupiable by the first communication node for reference signal transmission. Exemplarily, the first communication node is a terminal device, the second communication node is a network device, and the second communication node transmits high-layer signaling to the first communication node, where the high-layer signaling is used to configure the target time-bundling-size. In some embodiments, the second communication node can configure the target time-bundling-size (corresponding to the configuration information) to be adopted by the first communication node via high-layer signaling, and the first communication node can transmit reference signals whose quantity is the target time-bundling-size (corresponding to N) to the second communication node in bundled and continuous time units whose quantity is the target time-bundling-size.

Manner 2

The first communication node receives control information, such as downlink control information (DCI), transmitted by the second communication node. The first communication node transmits the one or more reference signals to the second communication node in the N bundled and continuous time units according to the control information. The control information indicates a target time-bundling-size, and the target time-bundling-size refers to a number of bundled and continuous time units occupiable by the first communication node for reference signal transmission. Optionally, the control information is further used to instruct the first communication node to transmit a reference signal to the second communication node. That is, the control information can also be used as SRS trigger signaling. In some embodiments, after receiving the control information from the second communication node, the first communication node parses the control information to obtain the target time-bundling-size, and then transmits the one or more reference signals to the second communication node in N (that is, the target time-bundling-size) bundled and continuous time units.

Manner 3

The first communication node receives control information transmitted by the second communication node. The first communication node determines a target time-bundling-size from multiple candidate time-bundling-sizes according to the control information, and transmits the one or more reference signals to the second communication node in N (that is, the target time-bundling-size) bundled and continuous time units. In some embodiments, the first communication node is a terminal device, the second communication node is a network device, the second communication node transmits high-layer signaling to the first communication node, where the high-layer signaling is used to configure the multiple candidate time-bundling-sizes, and the multiple candidate time-bundling-sizes include the target time-bundling-size. For example, the first communication node receives the high-layer signaling, where the high-layer signaling is used to configure a total of three candidate time-bundling-sizes of 2, 3, and 4. The first communication node can transmit a reference signal to the second communication node according to a candidate time-bundling-size (that is, the target time-bundling-size) indicated via the control information from the second communication node.

The foregoing embodiments describe the method for reference signal transmission, and the following describes a method for reference signal reception provided in embodiments of the application.

FIG. 5 is a flowchart of a method for reference signal reception provided in embodiments of the application. As illustrated in FIG. 5, the method may include the following.

501. A second communication node receives one or more reference signals transmitted by a first communication node in N bundled and continuous time units.

Each of the one or more reference signals corresponds to a same number of bundled and continuous time units, and N is an integer greater than 1. For example, transmitting one or more reference signals by the first communication node in N bundled and continuous time units can be understood as transmitting a reference signal by the first communication node in N continuous time units repeatedly, that is, each time unit is used to transmit a reference signal.

Optionally, the first communication node is a terminal device, such as a mobile phone, the second communication node is a network device, such as a base station, and the reference signal is an UL reference signal, such as an SRS. Optionally, the first communication node is a network device, such as a base station, the second communication node is a terminal device, such as a mobile phone, and the reference signal is a DL reference signal, such as a CRS.

In some embodiments, before performing step 501, the second communication node may perform the following operations. The second communication node transmits control information to the first communication node, where the control information indicates a target time-bundling-size, and the target time-bundling-size refers to a number of bundled and continuous time units occupiable by the first communication node for reference signal transmission. Optionally, the control information is further used to instruct the first communication node to transmit a reference signal to the second communication node. That is, the control information can also be used as SRS trigger signaling, so that the first communication node transmits a reference signal after receiving the control information.

502. The second communication node processes the one or more reference signals as a whole to obtain a target reference signal.

Optionally, the second communication node performs soft combining on the one or more reference signals to obtain the target reference signal. It can be understood that the second communication node can obtain a real reference signal more accurately by combining the one or more reference signals. In some embodiments, after performing step 502, the second communication node may perform operations such as channel estimation and channel quality measurement, which is not limited herein. Step 502 is optional, but not mandatory.

In embodiments of the application, the second communication node may combine reference signals in multiple time units to obtain an accurate reference signal, thereby improving the quality of SRS transmission.

In some embodiments, the second communication node receives capability signaling transmitted by the first communication node, where the capability signaling indicates whether the first communication node has a time bundling capability, and the time bundling capability is a capability to repeatedly transmit a reference signal in at least two bundled and continuous time units.

FIG. 5 illustrates a manner for the second communication node to receive the one or more reference signals transmitted by the first communication node in the N bundled and continuous time units. It should be understood that the first communication node needs to have the time bundling capability, that is, a capability to transmit a reference signal in multiple bundled and continuous time units. The following describes how the second communication node determines whether the first communication node has the time bundling capability.

In some embodiments, the second communication node receives the capability signaling transmitted by the first communication node, where the capability signaling indicates whether the first communication node has the time bundling capability, and the time bundling capability is a capability to repeatedly transmit a reference signal in at least two bundled and continuous time units.

Optionally, the time bundling capability is an SRS time bundling capability. The time bundling capability is a capability to repeatedly transmit a reference signal in at least two bundled and continuous time units. It can be understood that after transmitting the capability instruction to the second communication node, the first communication node can transmit a reference signal to the second communication node by using the time bundling capability, that is, transmit one or more reference signals to the second communication node in multiple bundled and continuous time units.

Optionally, the capability signaling includes a first field and a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission. Optionally, the target time-bundling-size is a target SRS time-bundling-size, which refers to the number of continuously transmitted SRSs.

In these embodiments, the first communication node can transmit the capability instruction to the second communication node to accurately indicate the target time-bundling-size, where the capability instruction occupies less bits.

In some embodiments, the first communication node is a terminal device, the second communication node is a network device, the second communication node transmits high-layer signaling to the first communication node, where the high-layer signaling is used to configure multiple candidate time-bundling-sizes for the first communication node. Each candidate time-bundling-size refers to a number of bundled and continuous time units occupiable by the first communication node for reference signal transmission. The high-layer signaling is used to configure multiple candidate time-bundling-sizes. The multiple candidate time-bundling-sizes include the target time-bundling-size. For example, the first communication node receives high-layer signaling, where the high-layer signaling is used to configure a total of three candidate time-bundling-sizes of 2, 3, and 4. The first communication node can transmit a reference signal to the second communication node according to a candidate time-bundling-size (that is, the target time-bundling-size) indicated via the control information from the second communication node.

In embodiments of the application, the second communication node configures multiple candidate time-bundling-sizes for the first communication node, and instructs via the control information the first communication node to transmit a reference signal by using one of the candidate bundling-sizes. It is possible to select a candidate time-bundling-size to transmit a reference signal according to the scenario, which has a wide application scenario.

The foregoing embodiments describe the method for reference signal transmission performed by the first communication node and the method for reference signal reception performed by the second communication node, and the following describes an interactive process of the first communication node and the second communication node to implement reference signal transmission.

Figure 6:
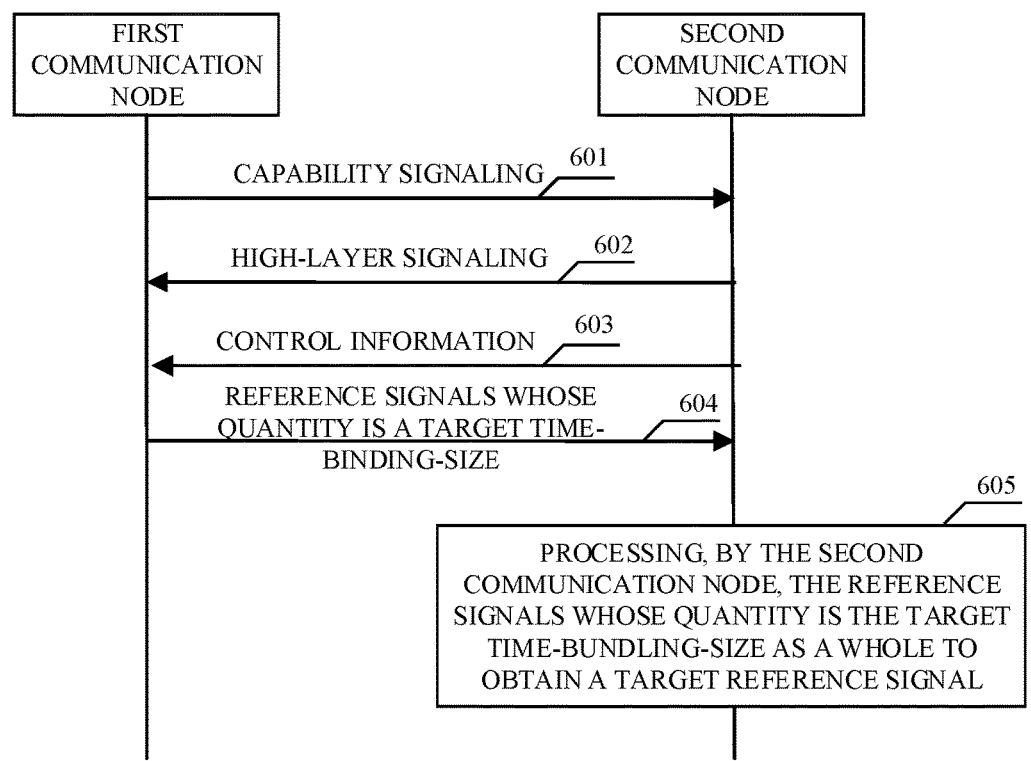
FIG. 6 is an interactive flowchart of a method for reference signal transmission provided in embodiments of the application.

FIG. 6 is an interactive flowchart of a method for reference signal transmission provided in embodiments of the application. FIG. 6 illustrates a further refinement of the method illustrated in FIGS. 1 and 5. As illustrated in FIG. 6, the method for reference signal transmission includes the following.

601. A first communication node transmits a capability instruction to a second communication node.

In these embodiments, step 601 is optional, but not mandatory. Optionally, before performing step 601, the first communication node may receive a capability query instruction from the second communication node. The capability query instruction is used to query whether the first communication node has a time bundling capability.

602. The second communication node transmits high-layer signaling to the first communication node.

The high-layer signaling is used to configure multiple candidate time-bundling-sizes for the first communication node. Each candidate time-bundling-size refers to a number of bundled and continuous time units occupiable by the first communication node for reference signal transmission. The multiple candidate time-bundling-sizes include a target time-bundling-size. The high-layer signaling is used to configure the multiple candidate time-bundling-sizes.

603. The second communication node transmits control information to the first communication node.

The control information indicates a target time-bundling-size, and the target time-bundling-size refers to a number of bundled and continuous time units occupiable by the first communication node for reference signal transmission.

604. The first communication node determines a target time-bundling-size from multiple candidate time-bundling-sizes according to the control information, and transmits reference signals whose quantity is the target time-bundling-size to the second communication node in bundled and continuous time units whose quantity is the target time-bundling-size.

605. The second communication node processes the reference signals whose quantity is the target time-bundling-size as a whole to obtain a target reference signal.

In embodiments of the application, the first communication node transmits one or more reference signals to the second communication node in N bundled and continuous time units, so that the second communication node processes the one or more reference signals as a whole to obtain an accurate reference signal, thereby reducing the transmission delay and improving the communication efficiency. Step 605 is optional, but not mandatory.

The foregoing embodiments has not described a structure of the first communication node and a structure of the second communication node. The following describes a manner for the first communication node to perform the method for reference signal transmission in conjunction with the structure of the first communication node, and a manner for the second communication node to perform the reference signal reception in conjunction with the structure of the second communication node.

Figure 7:
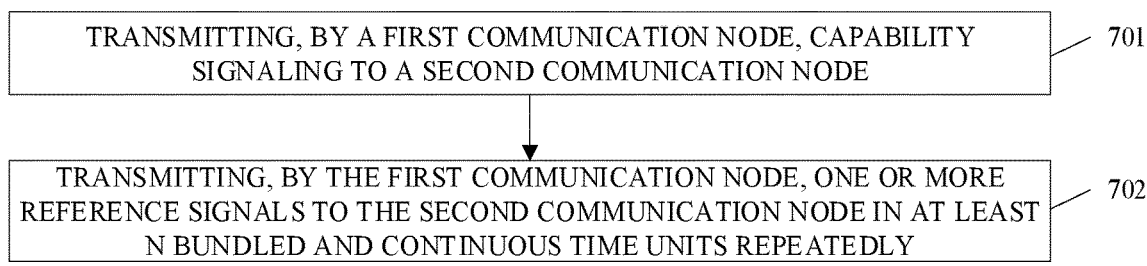
FIG. 7 is a flowchart of a method for communication provided in embodiments of the application.

FIG. 7 is a flowchart of a method for communication provided in embodiments of the application. As illustrated in FIG. 7, the method may include the following.

701. A first communication node transmits capability signaling to a second communication node, where the capability signaling indicates whether the first communication node has a time bundling capability, and the time bundling capability is a capability to repeatedly transmit one or more reference signals in at least two bundled and continuous time units.

Optionally, the first communication node is a terminal device, such as a mobile phone, and the second communication node is a network device, such as a base station. Optionally, the capability signaling includes a first field and/or a second field, the first field indicates whether the first communication node has a time bundling capability, the second field indicates a maximum time-bundling-size, and the maximum time-bundling-size refers to a maximum number of bundled and continuous time units occupiable by the first communication node for reference signal transmission. It should be understood that the number of bundled and continuous time units occupiable by the first communication node for reference signal transmission is less than or equal to the maximum time-bundling-size. In embodiments of the application, a target time-bundling-size is not greater than the maximum time-bundling-size.

702. The first communication node repeatedly transmits one or more reference signals to the second communication node in at least N bundled and continuous time units.

In embodiments of the application, the first communication node transmits a capability instruction to the second communication node, so as to transmit multiple identical reference signals in N bundled and continuous time units, which is simple to implement.

Figure 8:
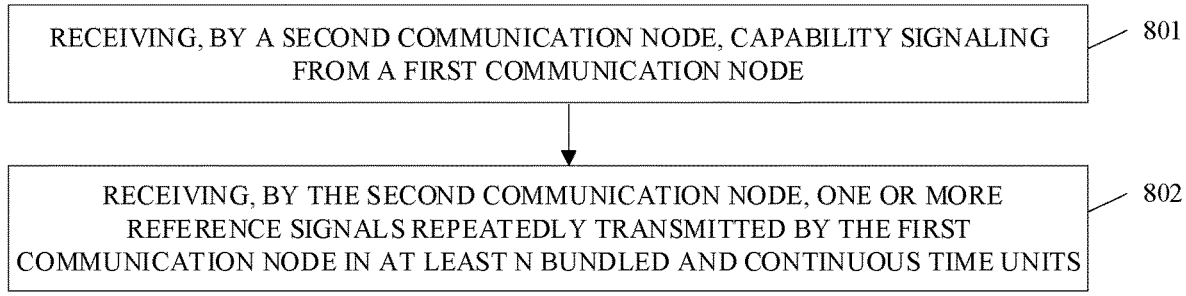
FIG. 8 is a flowchart of another method for communication provided in embodiments of the application.

FIG. 8 is a flowchart of a method for communication provided in embodiments of the application. As illustrated in FIG. 8, the method may include the following.

801. A second communication node receives capability signaling from a first communication node, where the capability signaling indicates whether the first communication node has a time bundling capability, and the time bundling capability is a capability to repeatedly transmit one or more reference signals in at least two bundled and continuous time units.

802. The second communication node receives one or more reference signals repeatedly transmitted by the first communication node in at least N bundled and continuous time units.

Figure 9:
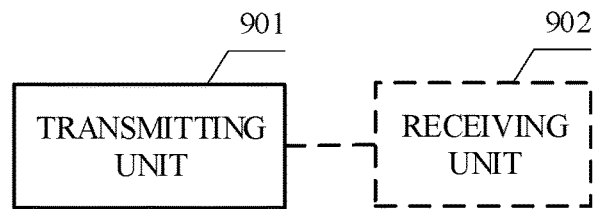
FIG. 9 is a schematic structural diagram of an apparatus for communication provided in embodiments of the application.

FIG. 9 is a schematic structural diagram of an apparatus for communication provided in embodiments of the application. The apparatus for communication in FIG. 9 corresponds to the first communication node described above. As illustrated in FIG. 9, the apparatus for communication includes a transmitting unit 901. The transmitting unit 901 is configured to transmit one or more reference signals to a second communication node in N bundled and continuous time units, where N is an integer greater than 1.

In optional implementations, the transmitting unit 901 is further configured to transmit capability signaling to the second communication node, where the capability signaling indicates whether the first communication node has a time bundling capability, and the time bundling capability is a capability to repeatedly transmit a reference signal in at least two bundled and continuous time units.

In optional implementations, the capability signaling includes a first field and a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission.

In optional implementations, the transmitting unit 901 is specifically configured to transmit the one or more reference signals to the second communication node in the N bundled and continuous time units according to configuration information, where the configuration information is used to configure a target time-bundling-size, and the target time-bundling-size refers to a number of bundled and continuous time units occupiable by the first communication node for reference signal transmission.

In optional implementations, the apparatus for communication further includes a receiving unit 902. The receiving unit 902 is configured to receive control information transmitted by the second communication node, where the control information indicates a target time-bundling-size, and the target time-bundling-size refers to a number of bundled and continuous time units occupiable by the first communication node for reference signal transmission. The transmitting unit 901 is specifically configured to transmit the one or more reference signals to the second communication node in the N bundled and continuous time units according to the control information.

In alternative implementations, the receiving unit 902 is further configured to receive high-layer signaling, where the high-layer signaling is used to configure multiple candidate time-bundling-sizes, and the multiple candidate time-bundling-sizes include the target time-bundling-size. The transmitting unit 901 is specifically configured to determine the target time-bundling-size from the multiple candidate time-bundling-sizes according to the control information, and transmit the one or more reference signals to the second communication node in the N bundled and continuous time units.

Figure 10:
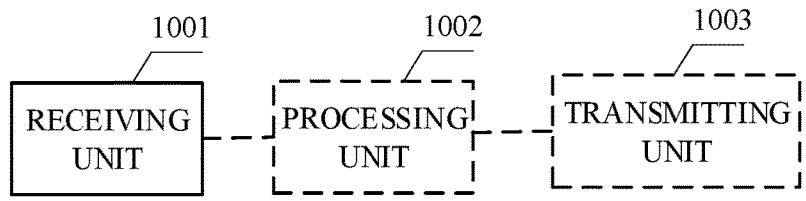
FIG. 10 is a schematic structural diagram of another apparatus for communication provided in embodiments of the application.

FIG. 10 is a schematic structural diagram of an apparatus for communication provided in embodiments of the application. The apparatus for communication in FIG. 10 corresponds to the second communication node described above. As illustrated in FIG. 10, the apparatus for communication includes a receiving unit 1001. The receiving unit 1001 is configured to receive one or more reference signals transmitted by a first communication node in N bundled and continuous time units, where N is an integer greater than 1.

In optional implementations, the apparatus further includes a processing unit 1002 configured to process the one or more reference signals as a whole to obtain a target reference signal.

In optional implementations, the receiving unit 1001 is further configured to receive capability signaling transmitted by the first communication node, where the capability signaling indicates whether the first communication node has a time bundling capability, and the time bundling capability is a capability to repeatedly transmit a reference signal in at least two bundled and continuous time units.

In optional implementations, the capability signaling includes a first field and a second field, the first field indicates whether the first communication node has the time bundling capability, the second field indicates a maximum time-bundling-size, and the maximum time-bundling-size refers to a maximum number of bundled and continuous time units occupiable by the first communication node for reference signal transmission.

In optional implementations, the apparatus for communication further includes a transmitting unit 1003. The transmitting unit 1003 is configured to transmit control information to the first communication node, where the control information indicates a target time-bundling-size, and the target time-bundling-size refers to a number of bundled and continuous time units occupiable by the first communication node for reference signal transmission.

In optional implementations, the transmitting unit 1003 is further configured to transmit high-layer signaling to the first communication node, where the high-layer signaling is used to configure multiple candidate time-bundling-sizes for the first communication node, each candidate time-bundling-size refers to a number of bundled and continuous time units occupiable by the first communication node for reference signal transmission, and the multiple candidate time-bundling-sizes include the target time-bundling-size.

Figure 11:
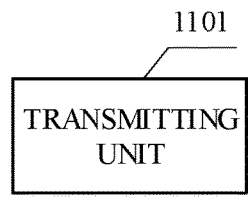
FIG. 11 is a schematic structural diagram of another apparatus for communication provided in embodiments of the application.

FIG. 11 is a schematic structural diagram of an apparatus for communication provided in embodiments of the application. The apparatus for communication in FIG. 11 corresponds to the first communication node described above. As illustrated in FIG. 11, the apparatus for communication includes a transmitting unit 1101. The transmitting unit 1101 is configured to transmit capability signaling to a second communication node, where the capability signaling indicates whether the first communication node has a time bundling capability, and the time bundling capability is a capability to repeatedly transmit one or more reference signals in at least two bundled and continuous time units.

Figure 12:
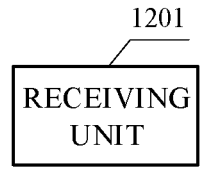
FIG. 12 is a schematic structural diagram of another apparatus for communication provided in embodiments of the application.

FIG. 12 is a schematic structural diagram of an apparatus for communication provided in embodiments of the application. The apparatus for communication in FIG. 12 corresponds to the second communication node described above. As illustrated in FIG. 12, the apparatus for communication includes a receiving unit 1201. The receiving unit 1201 is configured to receive capability signaling from a first communication node, where the capability signaling indicates whether the first communication node has a time bundling capability, and the time bundling capability is a capability to repeatedly transmit one or more reference signals in at least two bundled and continuous time units.

It should be understood that, division of units of the apparatus for communication in FIGS. 9 to 12 is merely logical function division. During actual implementation, all or some of the units may be integrated into one physical entity, or the units may be physically separated. For example, the units may be independently disposed processing elements, or may be integrated into a chip in a terminal for implementation. In addition, the units may be stored in a storage element in a controller in a form of program code, and a processing element in a processor invokes and performs functions of the units. In addition, the units may be integrated together or may be independently implemented. The processing element may be an integrated circuit chip and has a signal processing capability. In an implementation process, steps in foregoing methods or foregoing units can be implemented using a hardware integrated logical circuit in the processing element, or using instructions in a form of software. The processing element may be a general-purpose processor, for example, a central processing unit (CPU), or may be one or more integrated circuits configured to implement foregoing methods, for example, one or more application-specific integrated circuits (ASIC), one or more microprocessors (digital signal processor (DSP)), one or more field-programmable gate arrays (FPGA), etc.

Figure 13:
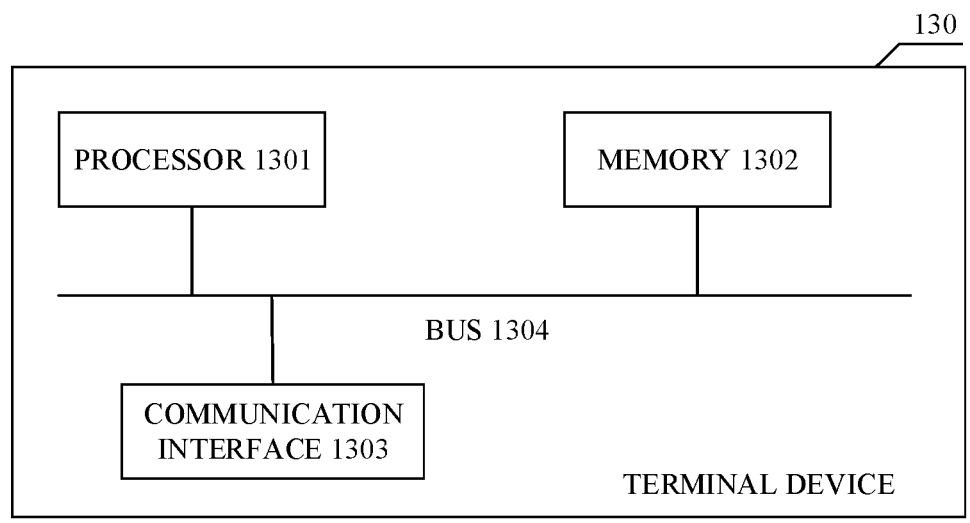
FIG. 13 is a schematic structural diagram of another apparatus for communication provided in embodiments of the application.

FIG. 13 is a schematic structural diagram of a terminal device provided in embodiments of the application. As illustrated in FIG. 13, the terminal device 130 includes a processor 1301, a memory 1302, and a communication interface 1303. The processor 1301, the memory 1302, and the communication interface 1303 are coupled with each other via a bus. The terminal device in FIG. 13 may be the first communication node in foregoing embodiments.

The memory 1302 includes, but is not limited to, a random access memory (RAM), a read-only memory (ROM), an erasable programmable ROM (EPROM), or a compact disc ROM (CDROM). The memory 1302 is configured to store related instructions and data. The communication interface 1303 is configured to receive and transmit data.

The processor 1301 may adopt a general-purpose CPU, a microprocessor, an ASIC, or one or more integrated circuits for executing related programs to implement the method for reference signal transmission provided in foregoing embodiments.

The processor 1301 may also be an integrated circuit chip with a signal processing capability. In an implementation process, steps of the method for reference signal transmission of the application can be implemented by a hardware integrated logic circuit in the processor 1301 or instructions in a form of software. The processor 1301 may also be a general-purpose processor, a DSP, an ASIC, a FPGA, or other programmable logic devices, discrete gates or transistor logic devices, or discrete hardware components. Methods, steps, and logic block diagrams disclosed in embodiments of the application can be implemented or executed. The general-purpose processor may be a microprocessor or any conventional processor or the like. Steps of the method disclosed in conjunction with embodiments of the application may be directly embodied as being executed by a hardware decoding processor, or executed by a combination of hardware and a software module in the decoding processor. The software module may be located in a mature storage medium in the field such as a random-access memory, a flash memory, a read-only memory, a programmable read-only memory, or an electrically erasable programmable memory, a register. The storage medium is located in the memory 1302. The processor 1301 reads information from the memory 1302 and implements the method for reference signal transmission and the method for communication provided in embodiments of the application in combination with its hardware.

The communication interface 1303 implements communication between the terminal device 130 and other devices or a communication network using a transceiver apparatus such as, but not limited to, a transceiver. A bus 1304 may include a pathway for communicating information between various components, such as the memory 1302, the processor 1301, and the communication interface 1303 of the terminal device 130. The communication interface 1303 may implement functions of the transmitting unit 901 and the receiving unit 902 in FIG. 9, and may also implement functions of the transmitting unit 1101 in FIG. 11.

The processor 1301 in the terminal device 130 is configured to read a program code stored in the memory 1302, to implement the method for reference signal transmission provided in foregoing embodiments.

Figure 14:
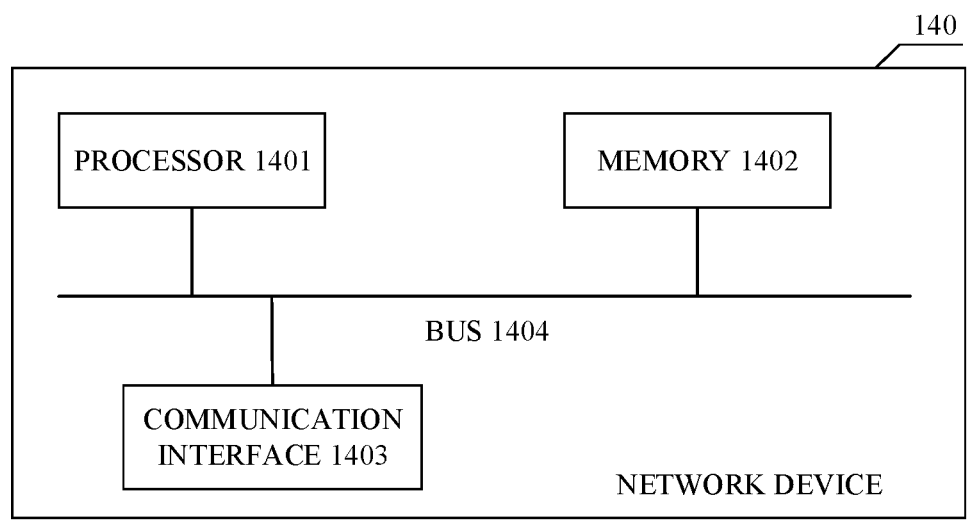
FIG. 14 is a schematic structural diagram of another apparatus for communication provided in embodiments of the application.

FIG. 14 is a schematic structural diagram of a network device provided in embodiments of the application. As illustrated in FIG. 14, the network device 140 includes a processor 1401, a memory 1402, and a communication interface 1403. The processor 1401, the memory 1402, and the communication interface 1403 are coupled with each other via a bus. The network device in FIG. 14 may be the second communication node in foregoing embodiments.

The memory 1402 includes, but is not limited to, a RAM, ROM, EPROM, or CDROM. The memory 1402 is configured to store related instructions and data. The communication interface 1403 is configured to receive and transmit data. The processor 1401 may adopt a general-purpose CPU, a microprocessor, an ASIC, or one or more integrated circuits for executing related programs to implement the method for reference signal reception provided in foregoing embodiments. The processor 1401 may implement functions of the processing unit 1002 in FIG. 10.

The communication interface 1403 implements communication between the network device 140 and other devices or a communication network using a transceiver apparatus such as, but not limited to, a transceiver. A bus 1404 may include a pathway for communicating information between various components, such as the memory 1402, the processor 1401, and the communication interface 1403 of the network device 140. The communication interface 1403 may implement functions of the receiving unit 1001 and the transmitting unit 1003 in FIG. 10, and may also implement functions of the receiving unit 1201 in FIG. 12.

A computer-readable storage medium is provided in embodiments of the application. The computer-readable storage medium stores computer programs which when executed are operable with a processor to: transmit one or more reference signals to a second communication node in N bundled and continuous time units, where N is an integer greater than 1.

Another computer-readable storage medium is provided in embodiments of the application. The computer-readable storage medium stores computer programs which when executed are operable with a processor to: receive one or more reference signals transmitted by a first communication node in N bundled and continuous time units, where N is an integer greater than 1.

A computer-readable storage medium is provided in embodiments of the application. The computer-readable storage medium stores computer programs which when executed are operable with a processor to: transmit capability signaling to a second communication node, where the capability signaling indicates whether a first communication node has a time bundling capability, and the time bundling capability is a capability to repeatedly transmit one or more reference signals in at least two bundled and continuous time units.

A computer-readable storage medium is provided in embodiments of the application. The computer-readable storage medium stores computer programs which when executed are operable with a processor to: receive capability signaling from a first communication node, where the capability signaling indicates whether the first communication node has a time bundling capability, and the time bundling capability is a capability to repeatedly transmit one or more identical reference signals in at least two bundled and continuous time units.

The above is merely specific implementations of the application, but the protection scope of the application is not limited to this. Any variation or replacement readily figured out by a person skilled in the art within the technical scope disclosed in the application shall fall within the protection scope of the application. Therefore, the protection scope of the application shall be subject to the protection scope of the claims.

What is claimed is:

1. A method for reference signal transmission, comprising:

transmitting, by a first communication node, capability signaling to a second communication node, wherein the capability signaling indicates the first communication node has a time bundling capability, and the time bundling capability is a capability to repeatedly transmit one or more reference signals in at least two continuous time units; wherein the capability signaling comprises at least one of a first field or a second field, the first field indicates the first communication node has the time bundling capability, the second field indicates a maximum time-bundling-size, and the maximum time-bundling-size refers to a maximum number of continuous time units occupiable by the first communication node for reference signal transmission; and transmitting, by the first communication node, one or more reference signals to the second communication node in N continuous time units, N being an integer greater than 1.

2. The method of claim 1, wherein prior to transmitting, by the first communication node, the one or more reference signals to the second communication node in the N continuous time units, the method further comprises:

receiving, by the first communication node, configuration information transmitted by the second communication node, wherein the configuration information is used to configure a target time-bundling-size, and the target time-bundling-size refers to a number of continuous time units occupiable by the first communication node for reference signal transmission; and determining, by the first communication node, the N continuous time units.

3. The method of claim 1, wherein prior to transmitting, by the first communication node, the one or more reference signals to the second communication node in the N continuous time units, the method further comprises:

receiving, by the first communication node, control information transmitted by the second communication node, wherein the control information indicates a target time-bundling-size, and the target time-bundling-size refers to a number of continuous time units occupiable by the first communication node for reference signal transmission; and determining, by the first communication node, the N continuous time units according to the control information.

4. The method of claim 3, wherein the first communication node is a terminal device, the second communication node is a network device, and prior to transmitting, by the first communication node, the one or more reference signals to the second communication node in the N continuous time units, the method further comprises:

receiving, by the first communication node, high-layer signaling, wherein the high-layer signaling is used to configure a plurality of candidate time-bundling-sizes, the plurality of candidate time-bundling-sizes comprise a target time-bundling-size, and the target time-bundling-size refers to a number of continuous time units occupiable by the first communication node for reference signal transmission; and determining, by the first communication node, the target time-bundling-size from the plurality of candidate time-bundling-sizes according to the control information, to determine the N continuous time units.

5. A method for reference signal reception, comprising:

receiving, by a second communication node, capability signaling from a first communication node, wherein the capability signaling indicates the first communication node has a time bundling capability, and the time bundling capability is a capability to repeatedly transmit one or more reference signals in at least two continuous time units; wherein the capability signaling comprises at least one of a first field or a second field, the first field indicates the first communication node has the time bundling capability, the second field indicates a maximum time-bundling-size, and the maximum time-bundling-size refers to a maximum number of continuous time units occupiable by the first communication node for reference signal transmission; and receiving, by the second communication node, one or more reference signals transmitted by the first communication node in N continuous time units, N being an integer greater than 1.

6. The method of claim 5, wherein prior to receiving, by the second communication node, the one or more reference signals transmitted by the first communication node in the N continuous time units, the method further comprises:

transmitting, by the second communication node, control information to the first communication node, wherein the control information indicates a target time-bundling-size, and the target time-bundling-size refers to a number of continuous time units occupiable by the first communication node for reference signal transmission.

7. The method of claim 5, wherein the first communication node is a terminal device, the second communication node is a network device, and the method further comprises:

transmitting, by the second communication node, high-layer signaling to the first communication node, wherein the high-layer signaling is used to configure one or more candidate time-bundling-sizes for the first communication node, and each candidate time-bundling-size refers to a number of continuous time units occupiable by the first communication node for reference signal transmission.

8. An apparatus for communication, applicable to a first communication node and comprising:

a processor;
a transceiver; and
a memory configured to store computer programs, wherein
the processor is configured to invoke and execute the computer programs stored in the memory to cause the transceiver to:
transmit capability signaling to a second communication node, wherein the capability signaling indicates the first communication node has a time bundling capability, and the time bundling capability is a capability to repeatedly transmit one or more reference signals in at least two continuous time units; wherein the capability signaling comprises at least one of a first field or a second field, the first field indicates the first communication node has the time bundling capability, the second field indicates a maximum time-bundling-size, and the maximum time-bundling-size refers to a maximum number of continuous time units occupiable by the first communication node for reference signal transmission; and transmit one or more reference signals to the second communication node in N continuous time units, N being an integer greater than 1.

9. The apparatus of claim 8, wherein the processor is further configured to invoke and execute the computer programs stored in the memory to:

cause the transceiver to receive configuration information transmitted by the second communication node, wherein the configuration information is used to configure a target time-bundling-size, and the target time-bundling-size refers to a number of continuous time units occupiable by the first communication node for reference signal transmission; and determine the N continuous time units.

10. The apparatus of claim 8, wherein the processor is further configured to invoke and execute the computer programs stored in the memory to:

cause the transceiver to receive control information transmitted by the second communication node, wherein the control information indicates a target time-bundling-size, and the target time-bundling-size refers to a number of continuous time units occupiable by the first communication node for reference signal transmission; and determine the N continuous time units according to the control information.

11. The apparatus of claim 10, wherein the processor is further configured to invoke and execute the computer programs stored in the memory to:

cause the transceiver to receive high-layer signaling, wherein the high-layer signaling is used to configure a plurality of candidate time-bundling-sizes, the plurality of candidate time-bundling-sizes comprise a target time-bundling-size, and the target time-bundling-size refers to a number of continuous time units occupiable by the first communication node for reference signal transmission; and determine the target time-bundling-size from the plurality of candidate time-bundling-sizes according to the control information, to determine the N continuous time units.

12. An apparatus for communication, applicable to a second communication node and comprising:

a processor;
a transceiver; and
a memory configured to store computer programs, wherein
the processor is configured to invoke and execute the computer programs stored in the memory to perform the method of claim 5.

13. The apparatus of claim 12, wherein the processor is further configured to invoke and execute the computer programs stored in the memory to cause the transceiver to:

transmit control information to the first communication node, wherein the control information indicates a target time-bundling-size, and the target time-bundling-size refers to a number of continuous time units occupiable by the first communication node for reference signal transmission.

14. The apparatus of claim 12, wherein the processor is further configured to invoke and execute the computer programs stored in the memory to cause the transceiver to:
   transmit high-layer signaling to the first communication node, wherein the high-layer signaling is used to configure one or more candidate time-bundling-sizes for the first communication node, each candidate time-bundling-size refers to a number of continuous time units occupiable by the first communication node for reference signal transmission, and the plurality of candidate time-bundling-sizes comprise a target time-bundling-size.

* * * * *